United States Patent
Holtom et al.

(10) Patent No.: US 10,452,669 B2
(45) Date of Patent: Oct. 22, 2019

(54) SIMPLIFYING QUANTITATIVE ANALYSIS OF TIME-BOUNDED RESOURCE CONSUMPTION

(71) Applicants: James Alexander Ivens Holtom, Chelmsford (GB); Eric Stewart Davison, Peppard Common (GB)

(72) Inventors: James Alexander Ivens Holtom, Chelmsford (GB); Eric Stewart Davison, Peppard Common (GB)

(73) Assignee: Ciena Corporation, Hanover, MD (US)

( * ) Notice: Subject to any disclaimer, the term of this patent is extended or adjusted under 35 U.S.C. 154(b) by 616 days.

(21) Appl. No.: 14/637,633

(22) Filed: Mar. 4, 2015

(65) Prior Publication Data

US 2015/0381454 A1    Dec. 31, 2015

Related U.S. Application Data

(60) Provisional application No. 62/017,562, filed on Jun. 26, 2014.

(51) Int. Cl.
| | |
|---|---|
| *H04L 12/26* | (2006.01) |
| *G06F 16/248* | (2019.01) |
| *G06F 17/30* | (2006.01) |
| *G06Q 10/02* | (2012.01) |

(52) U.S. Cl.
CPC .......... *G06F 16/248* (2019.01); *G06Q 10/02* (2013.01); *H04L 43/0894* (2013.01)

(58) Field of Classification Search
CPC ......... G06F 17/30864; G06F 17/30554; H04L 43/0894
USPC ...................................................... 707/722
See application file for complete search history.

(56) References Cited

U.S. PATENT DOCUMENTS

| | | |
|---|---|---|
| 7,505,419 B2 | 3/2009 | Janes |
| 8,046,466 B2 | 10/2011 | Sutou |
| 8,218,445 B2 | 7/2012 | Katz et al. |
| 8,346,212 B2 | 1/2013 | Breitzman et al. |
| 8,402,468 B2 | 3/2013 | Seidman et al. |

(Continued)

OTHER PUBLICATIONS

Santitoro, Ralph, "Bandwidth Profiles for Ethernet Services," Metro Ethernet Forum, V1.4, pp. 1-8.

(Continued)

*Primary Examiner* — Kuen S Lu
(74) *Attorney, Agent, or Firm* — Clements Bernard Walker PLLC; Christopher L. Bernard; Lawrence A. Baratta, Jr.

(57) ABSTRACT

A method implemented in a time-bounded resource management system for managing a resource is described. The time-bounded resource management system includes a processor communicatively coupled to a database. The method includes storing each resource consumption event of the resource as a balanced pair of entries in the database, wherein the balanced pair of entries comprise 1) a first entry comprising a start time for the resource consumption event and a positive resource consumption amount and 2) a second entry comprising an end time for the resource consumption event and a negative resource consumption amount with the same magnitude as the positive resource consumption amount; receiving a query related to the resource; performing computations on entries in the database related to the query; and providing a result based on the computations as a response to the query.

20 Claims, 5 Drawing Sheets

(56) References Cited

U.S. PATENT DOCUMENTS

| | | |
|---|---|---|
| 8,665,752 B2 | 3/2014 | Davison |
| 8,683,028 B2 | 3/2014 | Davison et al. |
| 2002/0152305 A1 | 10/2002 | Jackson et al. |
| 2010/0287416 A1* | 11/2010 | Shacham ............ G06F 11/0709 714/39 |
| 2012/0221454 A1* | 8/2012 | Morgan ................ G06F 9/5027 705/37 |
| 2013/0290960 A1* | 10/2013 | Astete ................. G06F 9/45533 718/1 |
| 2014/0177439 A1 | 6/2014 | Holness et al. |
| 2014/0379924 A1* | 12/2014 | Das ........................ H04L 47/72 709/226 |
| 2015/0249620 A1* | 9/2015 | Folsom ................ H04L 47/821 370/392 |
| 2016/0295566 A1* | 10/2016 | Morper ................ H04W 72/04 |

OTHER PUBLICATIONS

Santitoro, Ralph, "Metro Ethernet Services—A Technical Overview" Metro Ethernet Forum, V2.6, pp. 1-19.

\* cited by examiner

| + | REF | POLICER REF | CIR | EIR | EDGE TIME |

| - | REF | POLICER REF | CIR | EIR | EDGE TIME |

SIMPLIFYING QUANTITATIVE ANALYSIS OF TIME-BOUNDED RESOURCE CONSUMPTION

CROSS-REFERENCE TO RELATED APPLICATION(S)

The present non-provisional patent application/patent claims priority to U.S. Provisional Patent Application No. 62/017,562, filed on Jun. 26, 2014, and entitled "SIMPLIFYING QUANTITATIVE ANALYSIS OF TIME-BOUNDED RESOURCE CONSUMPTION," the contents of which are incorporated in full by reference herein.

FIELD OF THE DISCLOSURE

The present disclosure relates generally to resource reservation systems and methods. More particularly, the present disclosure relates to simplifying quantitative analysis of time-bounded resource consumption in resource reservation systems and methods.

BACKGROUND OF THE DISCLOSURE

Resource management systems and methods track usage of resources over time. Resources can include, without limitation, bandwidth, seats (train, plane, etc.), appointments, and the like. For illustration purposes, the foregoing descriptions focus on bandwidth as the resources being reserved. Where a bandwidth allocation is made for a defined period—such as with Software Defined Networking (SDN)—the consumption of a resource ceases to be a simple linear problem. By adding the second dimension of time to bandwidth allocations, this renders the problem of identifying booked consumption at any given time non-trivial. To perform the calculation, it is necessary to analyze every booking of the resource, to establish the bounds of the booking, and thus whether that booking must be included in the total consumption for the given time point. Whilst this process clearly scales linearly with the number of bookings of the resource, what is less immediately obvious is that this extends to all bookings known to the system for the resource, not just those simultaneously active at the point of reference. In the scenario of a shared SDN port, the very scenario for which this capability is required, the presence of a long 'order book' into the future (plus any historic log, for billing, regulatory or other purposes) both contribute to seriously degrade the performance of the functionality. This has the effect of compromising the ability to service customer demands, and constraining scalability.

The process of tracking resource where reservations start and stop with varying times and with overlaps (to the extent permitted by available bandwidth) is computationally expensive, and does not scale well with increased use of the system.

BRIEF SUMMARY OF THE DISCLOSURE

In an exemplary embodiment, a method implemented in a time-bounded resource management system for managing a resource is described and the time-bounded resource management system includes a processor communicatively coupled to a database. The method includes storing each resource consumption event of the resource as a balanced pair of entries in the database, wherein the balanced pair of entries include 1) a first entry including a start time for the resource consumption event and a positive resource consumption amount and 2) a second entry including an end time for the resource consumption event and a negative resource consumption amount with the same magnitude as the positive resource consumption amount; receiving a query related to the resource; performing computations on entries in the database related to the query; and providing a result based on the computations as a response to the query. The query can be to determine instantaneous consumption of the resource at a certain time, and wherein the computations are a summation of all entries in the database up to the certain time. The query can be to determine a peak consumption value or if additional consumption can be accommodated in a specified time period, wherein the computations are 1) a summation of all entries in the database up to a start time of the specified time period, and 2) iterating all entries in the database between the start time and an end time of the specified period to determine adjustments to a high-water mark, and wherein the high-water mark at the end of iterating all the entries is the peak consumption value. The database can support Structured Query Language (SQL) and the summing is performed through an SQL function. The resources can be modeled separately for each of a plurality of connections and/or links in a network. Optionally, the resources can be packet bandwidth. The storing can be performed in addition to maintaining a database order book for each resource. The method can be implemented in a Network Management System (NMS) and utilized to visually present instantaneous consumption on a per link basis. Coherency in the database can be checked by the query having the start time and the end time based on a maximum representation of time permitted with an expected output for consumption of zero. Each resource consumption event in the database can be removed after each associated end time.

In another exemplary embodiment, a time-bounded resource management system includes a network interface; a processor; a database, wherein the network interface, the processor, and the database are communicatively coupled together; and memory storing instructions that, when executed, cause the processor to store each resource consumption event of the resource as a balanced pair of entries in the database, wherein the balanced pair of entries include 1) a first entry including a start time for the resource consumption event and a positive resource consumption amount and 2) a second entry including an end time for the resource consumption event and a negative resource consumption amount with the same magnitude as the positive resource consumption amount, receive a query related to the resource, via the network interface, perform computations on entries in the database related to the query, and provide a result based on the computations as a response to the query. The query can be to determine instantaneous consumption of the resource up to a certain time, and wherein the computations are a summation of all entries in the database up to the certain time. The query can be to determine a peak consumption value or if additional consumption can be accommodated in a specified time period, wherein the computations are 1) a summation of all entries in the database up to a start time of the specified time period, and 2) iterating all entries in the database between the start time and an end time of the specified period to determine adjustments to a high-water mark, and wherein the high-water mark at the end of iterating all the entries is the peak consumption value. The database can support Structured Query Language (SQL) and the summing is performed through an SQL function. Resources can be modeled for each of a plurality of connections and/or links in a network. The resources can be packet bandwidth. The modeling can be performed in addition to maintaining a database order book for each resource. The system can be a Network Management System (NMS) that visually presents current resource allocation on a per link basis.

In a further exemplary embodiment, a management system communicatively coupled to one or more network elements in a network includes a network interface communicatively coupled to the one or more network elements; a processor; a database, wherein the network interface, the processor, and the database are communicatively coupled together; and memory storing instructions that, when executed, cause the processor to store each resource consumption event of the resource as a balanced pair of entries in the database, wherein the balanced pair of entries include 1) a first entry including a start time for the resource consumption event and a positive resource consumption amount and 2) a second entry including an end time for the resource consumption event and a negative resource consumption amount with the same magnitude as the positive resource consumption amount, receive a query to determine instantaneous resource utilization on a specific path in the network, sum all of the events in the database related to the query up to a present time, and provide the sum as a response to the query. The memory storing instructions that, when executed, further cause the processor to visually display a representation of the network, and visually display the instantaneous resource utilization for each link in the network.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, simplifying quantitative analysis of time-bounded resource consumption in resource reservation systems and methods is described. The conceptualization described herein looks at the problem from a resource-basis, instead of a more natural consumer basis. Rather than rendering the problem as a collection of continuous consumption allocations, the model described herein generates a balanced pair of discrete consume/release events. The systems and methods can be utilized with any time-bounded resource management system. This extends beyond networking (bandwidth), but could equally apply to the hospitality industry, vehicle-rental, utility (power). Advantageously, by modeling resource consumption with the techniques described herein, a lookup for resources consumed in a specific time period, simply becomes a summation in a database which is highly efficient.

The systems and methods establish the principle of modelling consumption allocations, not as a block of continuous consumption, but instead as a pair of edges, consuming and releasing (a portion of) the resource—i.e. a resource-centric model, rather than a consumer-centric view. Note, this modelling is performed as an addition to the existing techniques used to track order bookings for resources. As is described herein, the advantage of this additional modeling is an ability to almost instantaneously determine resource usage at present, or a peak amount for any other given time interval.

Each consumption allocation is represented by a balanced pair of time-indexed events, one additive, and the other reductive. The consumption allocation can be stored in a database.

The conventional way of recording allocations would be:

| Time Start | Time End | Resource Reference | Consumption Amount |
| --- | --- | --- | --- | where Time Start indicates a starting time, Time End indicates an ending time, Resource Reference is an identifier, and Consumption Amount is indicative of the amount of resources utilized.

In an exemplary embodiment, this information be stored as:

| Time Start | Resource Reference | Consumption Amount |
| --- | --- | --- |
| Time End | Resource Reference | Negative(Consumption Amount) |

Where the Resource Reference is the same for both entries since they each correspond to the same resource. However, the Consumption Amount was positive at the Time Start and negative at the Time End. Note, often it is the case where the end time is not known. In this case, the Time End can be set to infinity or some other far off date, i.e. such as the maximum time value representable by the system. Practically, in this case, the Time End may be corrected in when the resource is de-allocated.

This model radically simplifies both the concepts of operations, and the implementation. By simple sorting of the events according to the time, it is possible to identify only those events of relevance to the time of interest, and by simple summation of the events achieve a measurement of consumption at that time. That is, the entire problem with an unspecified number of bookings of a single resource can be reduced to the simple Structured Query Language (SQL) function: "SELECT SUM(resource) WHERE time<=% time-of-interest %" in the database.

Furthermore, a simple validation of record coherency in the database can be achieved by invoking the algorithm using the maximum representation of time permitted by the system; which, given the requirement for all allocations to be paired, this will (provided no records are missing/corrupted) give a consumption of zero.

Where a reservation is adjusted during envelope delimited by the reservation, the original 'end' event edge is removed and replaced with a new 'end' edge at the time of the change, together with a new pair of start/stop edges for the as-adjusted value.

Preserving the magnitude equivalence for each pair is essential to enabling simple management of allocations, without requiring interdependencies with other pairings. In normal operation it is to be expected that consumption requirements may change, although the nature of the change will impact upon the solution. To change the timing, or quantity of consumption requires no special consideration.

However, where the quantity of consumption must change within the overall allocation period, this must be achieved by the use of contiguous allocations for each of the required quantities, i.e. the balanced pair for the first quantity, another for the second and so on—thereby preserving the model, without restricting the applicability to specific usage patterns.

In practical terms, where an allocation is adjusted during the time envelope delimited by the reservation—i.e. after the start-time has passed, but the end-time has not—this only requires the creation of an additional consumption pair, for the revised consumption settings. To preserve the pairing of allocations, the original 'end' event edge is removed and replaced with a new 'end' event edge at the time of the change; additionally a new pair of start/stop edges is created for the as-adjusted value, starting consecutive with the new 'end' event, and ending at the required time.

Where the consume and release events of a given pair both occur in the past, these edges are no-longer required for computation of consumption, indeed the efficiency of the system would be enhanced by their removal—either to archive storage for regulatory or billing purposes if required, or otherwise they may simply be erased.

Figure 1:
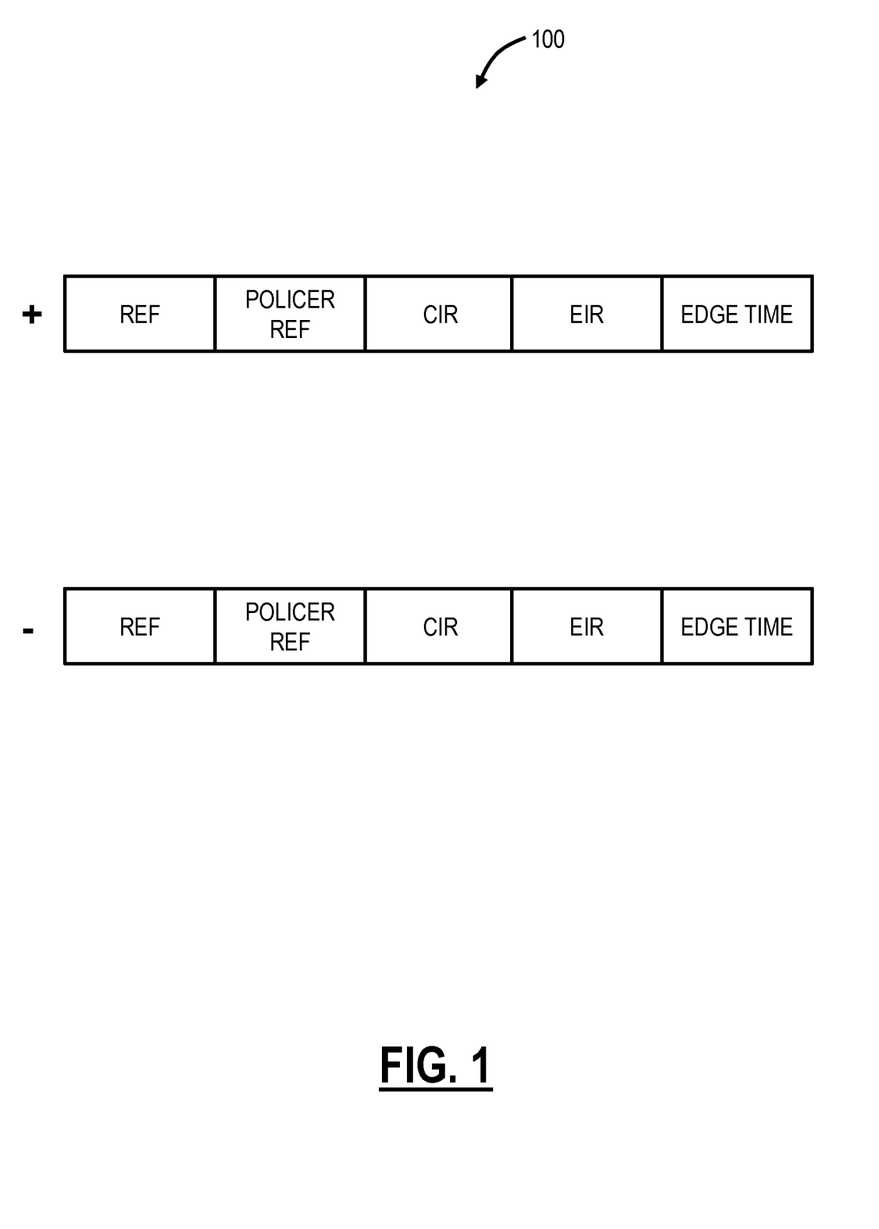
FIG. 1 is a block diagram of a database entry for a resource in a networking system.

Referring to FIG. 1, in an exemplary embodiment, a block diagram illustrates a database entry for a resource 100 in a networking system. For example, the networking system can be Ethernet, or more particularly Carrier Ethernet providing Provider Backbone Bridge Traffic Engineering (PBB-TE) and Multiprotocol Label Switching-Transport Profile (MPLS-TP) tunnels. The networking system can also provide the configuration of Ethernet services such as ELINE and ELAN on these resources. It is possible to reserve bandwidth for these services, and in such circumstances this requires the management system to prevent conflicts that would block such services carrying their allocations.

Again, the process of tracking resource where reservations start and stop with varying times and with overlaps (to the extent permitted by available bandwidth) is computationally expensive, and does not scale well with increased use of the system. However, with the systems and methods described, the process becomes a simple summation over a desired time period, to find a peak resource utilization up to the desired time period. From a planning perspective, what is of interest is the peak resource consumption within the desired time period, which is obtained by taking the instantaneous consumption at the start of the window of interest, and then processing each event within the period (i.e., startTime<edgeTime<=endTime), to establish the 'high-water mark'—and by inference—determine the spare capacity.

In FIG. 1, the resource 100 can be modeled as two entries in a database. Each entry can include a reference (REF) identifying the resource, a policer reference identifying the resource in a traffic policer, a Committed Information Rate (CIR), an Extended or Excess Information Rate (EIR), and an edge time. The first entry is for the start time of the resource 100—here, the edge time is the start time and the CIR and EIR are positive values. The second entry is for the end time of the resource 100—here, the edge time is the end time and the CIR and EIR are negative values (but the same magnitude as the first entry). Additionally, the resources, in the networking example, can be modeled on a per link or per line, or per port, or any other constrained resource basis.

The CIR is the average guaranteed bandwidth for a resource under normal conditions, i.e. a resource's available bandwidth should not fall below the CIR. Above the CIR, an allowance of burstable bandwidth is often given, whose value can be expressed in terms of additional rate (known as the Excess Information Rate (EIR)) or as its absolute value (Peak Information Rate, PIR). The provider guarantees that the resource will always support the CIR rate, and sometimes the EIR rate provided that there is adequate bandwidth. The PIR, i.e. the CIR plus excess burst rate (EIR), is either equal to or less than the speed of the associated ports in the network.

Thus, from a practical consideration, the sum of all CIR rates at any given time must be less than or equal to the maximum resource availability. The sum of all EIR rates can exceed the maximum resource availability, as the EIR is oversubscribed and shared between connections.

For example, assume a 10 Gb/s Ethernet resource, i.e. 10 GbE. For ease of illustration, assume 8 resources are added, each with 1 Gb/s CIR and 2 Gb/s EIR (start and end times are irrelevant for this example). To determine the current usage of the 10 Gb/s Ethernet resource, a simple SQL sum function determines 8 Gb/s CIR and 16 Gb/s EIR. Since the 10 Gb/s Ethernet resource has 8 Gb/s guaranteed, it has 2 Gb/s left for the EIR and with 16 Gb/s EIR reserved, there is an 8:1 oversubscription ratio here (16 Gb/s divided by 2 Gb/s). Of course, this example can be extended for different time intervals.

Various other examples are contemplated herewith. For example, in a practical network scenario, resources may be reserved in discrete chunks, e.g. 100 Mb/s, 250 Mb/s, 500 Mb/s, etc., and maximum resource availability can be 1 Gb/s, 10 Gb/s, 40 Gb/s, 100 Gb/s, etc. Thus, a practical scenario could see hundreds or thousands of resources at a time. The advantage of the modeling presented herein is the query—how much resource utilization do I have now or a peak amount over a determined time interval—is answered by simple summations in SQL. This can provide a near instantaneous answer to a rather complex query.

Figure 2:
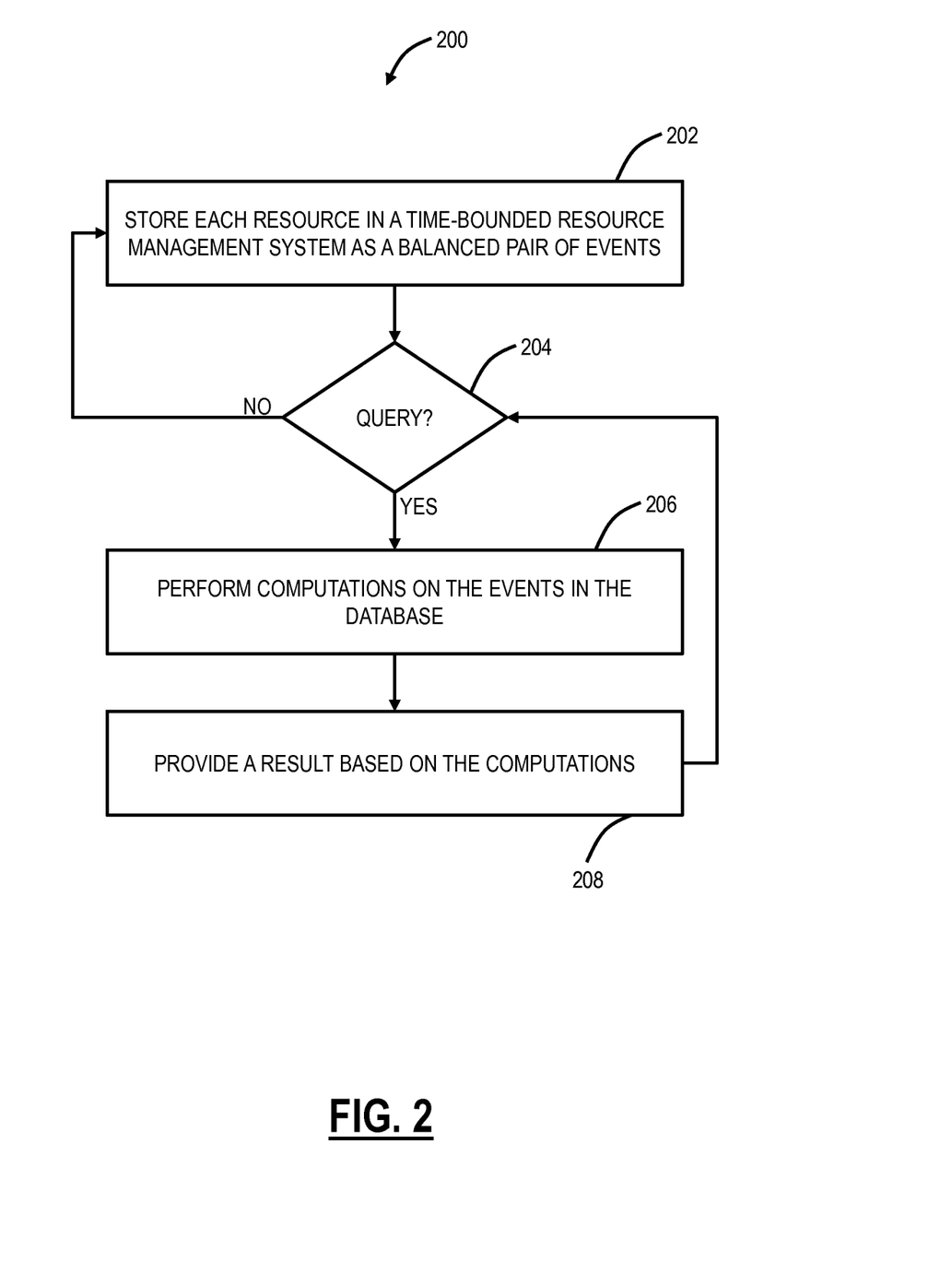
FIG. 2 is a flow chart of a resource management method.

Referring to FIG. 2, in an exemplary embodiment, a flow chart illustrates a resource management method 200. The resource management method 200 contemplates operation on a server, such as the server 300 in FIG. 3. Again, the resource management method 200 can be utilized with any time-bounded resource management system. The resource management method 200 provides 1) a method to efficiently model resource usage in the time-bounded resource management system and 2) a method to compute peak resource usage over a defined time range.

The resource management method 200 includes storing each resource in a time-bounded resource management system as a discrete, balanced pair of events in a database (step 202). A start time for a resource is modeled with a positive resource consumption amount and an end time for the resource is modeled with a negative resource consumption amount with the same magnitude as the positive resource consumption amount. Each of the start time and the end time can be a separate entry in the database. The end time is either known and set accordingly or set to a long term value that is modified to a present time when the connection is terminated. That is, for an unknown end time, the end time is set to infinity or some other far off date, to ensure database consistency, and this end time is modified at the point when the resource is terminated or de-allocated.

Note, the modeling herein is done in addition to other data management of the resource. That is, the resource management method 200 is not meant to replace resource tracking systems, such as which keep track of reservations and the like. Rather, the modeling is done in addition to provide a near instantaneous technique to determine peak resource usage over any time period or actual resource usage at any instant in time. It is not expected that the modeling adds data complexity since it is merely a list that keeps track of start time, end time, and resource consumption amount (positive or negative). The two records, the start time and the positive resource consumption amount and the negative resource consumption amount, are added when a new resource is added or booked; the end time may be updated when the resource is de-allocated or terminated; both records can be removed when the resource is removed.

The resource management method 200 includes receiving a query to determine resource utilization (step 204). For example, the query can be in the context of resource reservation—are there enough resources available for the time period needed? Also, the query can be to check the integrity of the database—check the resources available for the time period over all time which should sum to zero. The query can also be in the context of how much resources are being used right now—i.e., a time period equal to now.

The resource management method 200 includes performing computations on the events in the database (step 206); and providing a result based on the computations (step 208). The query can be to determine current resource utilization or to determine whether a new resource can be supported in a certain time period. Thus, the resource management method 200 contemplates two exemplary queries—1) reporting consumption in real-time, by a simple summation of all events up to the current time, and 2) providing answers to what resource amounts are available given any time period, based on providing a peak resource amount consumed in the time period.

The first exemplary query is performed by summing all events in the past up until the current time (or any other specific time of interest), and the result shows the current consumption at the current or specified time of interest, i.e. the instantaneous consumption. For resources that have been released, they will be zero in the summation with the negative amount offsetting the positive amount, and only current resources will be positive, yielding the instantaneous consumption as a sum of all of the current resources which have not been released. Optionally, the database supports Structured Query Language (SQL) and the summing is performed through an SQL function, i.e. "SELECT SUM (resource) WHERE time<=% time-of-interest %" in the database. Note, this SQL function can provide the instantaneous usage up to the time-of-interest.

For the second exemplary query, the query determines a high-water mark utilization during a specified time period. Note, this second exemplary query can also be used to determine if additional utilization can be accommodated within the specified time period. The second exemplary query includes first determining the consumption amount at the start of the specified time period through a summation is provided up to the start of the time period. Next, the second exemplary query includes obtaining all events after the start of the specified time period and before the end of the specified time period. Each event record is iterated to add the respective event value to the running total and to adjust the reference value for the high-water mark, following comparison with the running total. That is, each event record is processed to determine if it establishes a new high-water mark in the specified time period.

The resource management method 200 can include resources being modeled for each of a plurality of connections and/or links in a network, and the resources can be packet bandwidth such as CIR, EIR, etc. The modeling, in the resource management method 200, is performed in addition to maintaining a database order book for each resource. The resource management method 200 can be implemented in a Network Management System (NMS) and utilized to visually present current resource allocation on a per link basis.

Again, as described herein, for consistency purposes, the resource management method 200 keeps symmetric entries—a positive value, followed by an equal negative value at a different point in time. In the case of a change in resource consumption amount, the resource management method 200 proposes to end a current resource allocation—change the stop time to the time of the change and retain the resource amount as the negative of the original positive value, and to create a new resource allocation with the changed resource consumption amount having a start time consecutive with the as-revised stop time and a stop time corresponding with the desired stop.

The resource management method 200 is also advantageous for a system where resources are shared, such as packet resources and the like.

Figure 3:
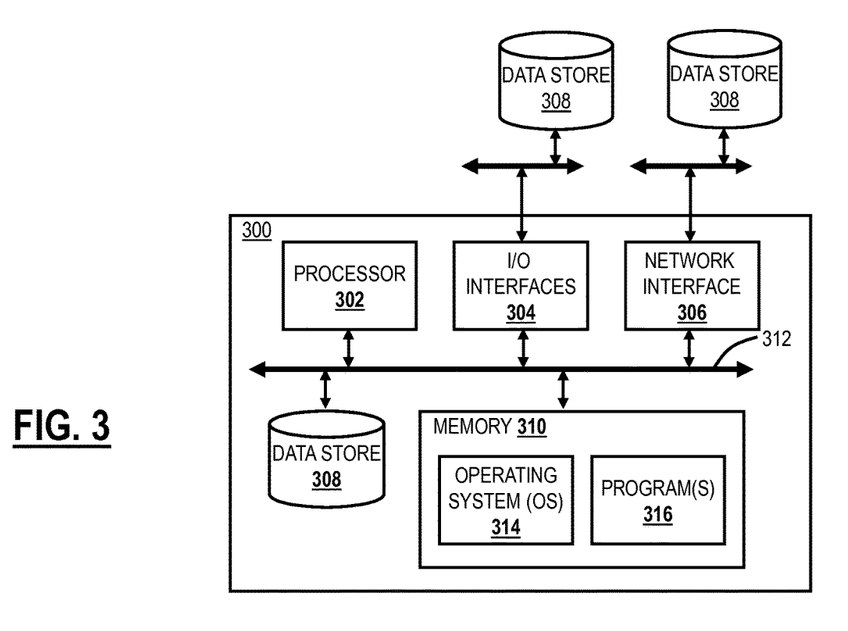
FIG. 3 is a block diagram of a server for implementing the systems and methods.

Referring to FIG. 3, in an exemplary embodiment, a block diagram illustrates a server 300 which may be used to implement the resource management method 200. The server 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 3 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example, but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 may be used to receive user input from and/or for providing system output to one or more devices or components. User input may be provided via, for example, a keyboard, touch pad, and/or a mouse. System output may be provided via a display device and a printer (not shown). I/O interfaces 304 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 may be used to enable the server 300 to communicate on a network, such as the Internet, a wide area network (WAN), a local area network (LAN), and the like, etc. The network interface 306 may include, for example, an Ethernet card or adapter (e.g., 10BaseT, Fast Ethernet, Gigabit Ethernet, 10GbE) or a wireless local area network (WLAN) card or adapter (e.g., 802.11a/b/g/n). The network interface 306 may include address, control, and/or data connections to enable appropriate communications on the network. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 308 may be located internal to the server 300 such as, for example, an internal hard drive connected to the local interface 312 in the server 300. Additionally in another embodiment, the data store 308 may be located external to the server 300 such as, for example, an external hard drive connected to the I/O interfaces 304 (e.g., SCSI or USB connection). In a further embodiment, the data store 308 may be connected to the server 300 through a network, such as, for example, a network attached file server. The data store 308 can include the database for modeling resources as described herein.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein.

In an exemplary embodiment, the programs 316 can include instructions that, when executed, cause the processor 302 to store each resource consumption event of the resource as a balanced pair of entries in the database, wherein the balanced pair of entries include 1) a first entry including a start time for the resource consumption event and a positive resource consumption amount and 2) a second entry including an end time for the resource consumption event and a negative resource consumption amount with the same magnitude as the positive resource consumption amount, receive a query related to the resource, via the network interface, perform computations on entries in the database related to the query, and provide a result based on the computations as a response to the query. The query can be to determine instantaneous consumption of the resource up to a certain time, and wherein the computations are a summation of all entries in the database up to the certain time. The query can be to determine a peak consumption value or if additional consumption can be accommodated in a specified time period, and wherein the computations are 1) a summation of all entries in the database up to a start time of the specified time period, and 2) iterating all entries in the database between the start time and an end time of the specified period to determine adjustments to a high-water mark, wherein the high-water mark at the end of iterating all the entries is the peak consumption value. The database can support Structured Query Language (SQL) and the summing is performed through an SQL function.

Figure 4:
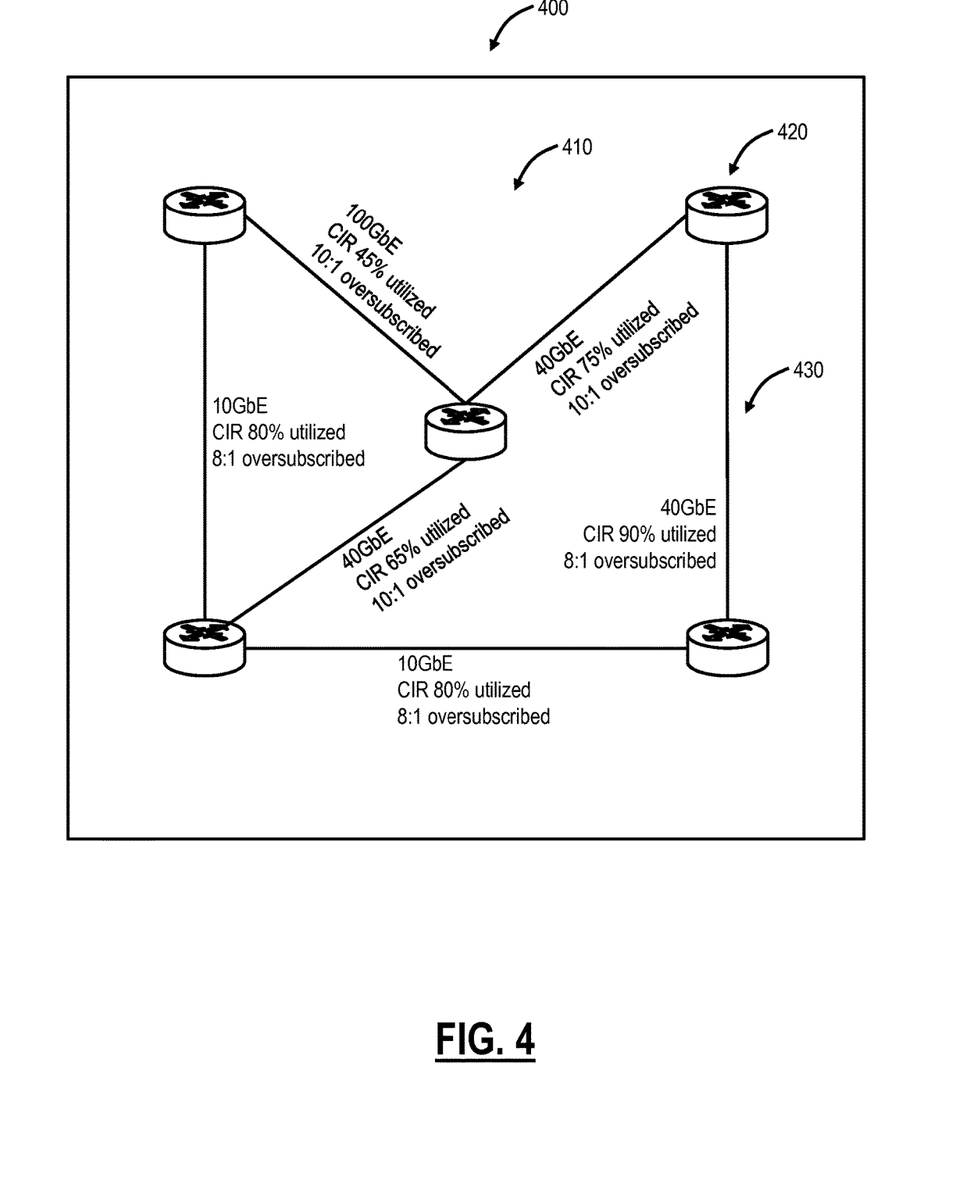
FIG. 4 is a screen shot of a Graphical User Interface (GUI) of a Network Management System (NMS)

Referring to FIG. 4, in an exemplary embodiment, a screen shot illustrates a Graphical User Interface (GUI) 400 of a Network Management System (NMS). The NMS utilizes the resource management method 200 to provide real-time notifications of resource utilization in the GUI 400. The NMS relates to activities, methods, procedures, and tools that pertain to the Operation, Administration, Maintenance, and Provisioning (OAMP) of networks, such as a network 410 illustrated in the GUI 400. The network 410 includes a plurality of network elements 420 interconnected by network links 430. The GUI 400 provides a visualization of the network 410 for OAM&P purposes.

The network elements 420 can include, without limitation, a Packet-Optical Transport System (POTS) that consolidates the functionality of a multi-service provisioning platform (MSPP), digital cross connect (DCS), Ethernet and/or Optical Transport Network (OTN) switch, dense wave division multiplexed (DWDM) platform, etc. into a single, high-capacity intelligent switching system providing Layer 0, 1, 2, and/or 3 consolidation. In another exemplary embodiment, the network elements 420 can be any of an OTN add/drop multiplexer (ADM), a SONET/SDH/OTN ADM, a multi-service provisioning platform (MSPP), a digital cross-connect (DCS), an optical cross-connect, an optical switch, a router, a switch, a wavelength division multiplexing (WDM) terminal, an access/aggregation device, etc.

In an exemplary aspect, the NMS can use the resource management method 200 to continually update the GUI 400 with the present resource utilization of each of the network links 430. In this manner, network operators, administrators, planners, etc. can have a visualization of traffic utilization on each of the links, without added complexity.

In terms of the queries associated with the resource management method 200, the resource management method 200 can manage resource allocation on a per network link basis. Thus, for a resource allocation on a path A-Z with intermediate network elements, the resource management method 200 can be implemented for each network link 430 with the results provided in aggregate and based on the weakest network link, i.e. the network link which has the least resources available thereon.

Figure 5:
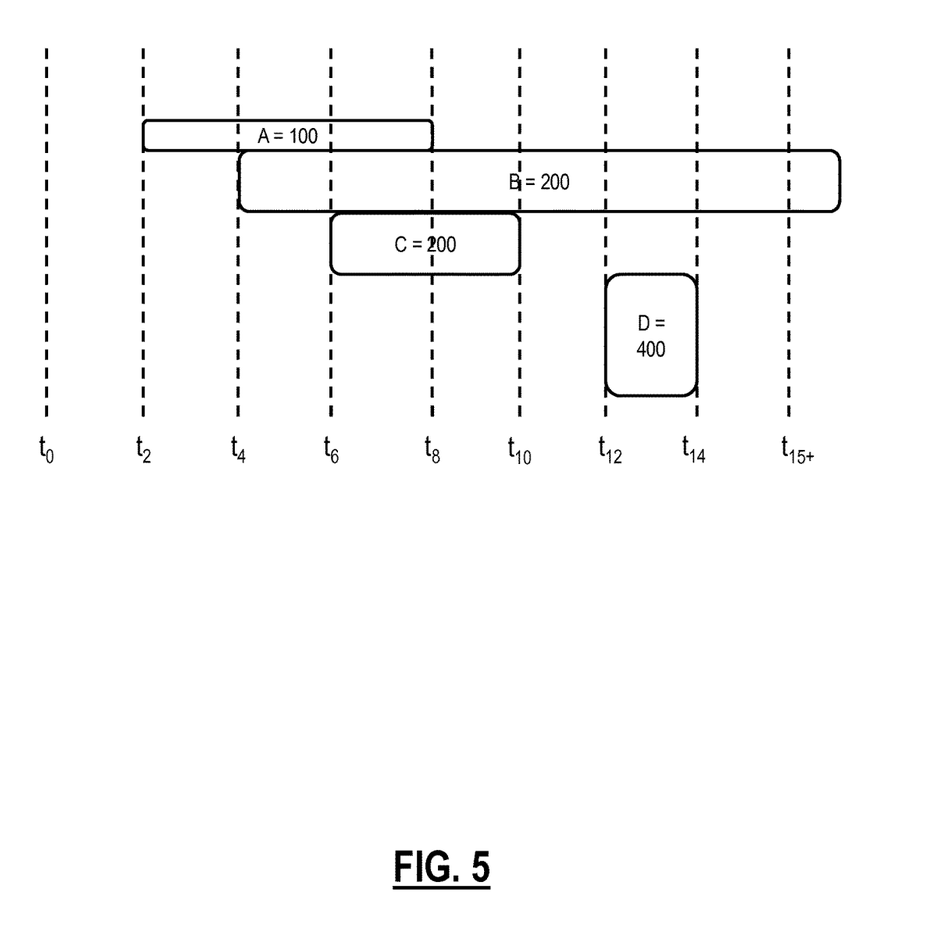
FIG. 5 is a diagram of resource utilizations A, B, C, D over time for an example of the systems and methods described herein.

Referring to FIG. 5, in an exemplary embodiment, a diagram illustrates resources A, B, C, D over time for an example of the systems and methods described herein. In an exemplary embodiment, the resources A, B, C, D can be bandwidth usage on a network link, although other embodiments are also contemplated. The following table provides an example of a database for the resources A, B, C, D in FIG. 5 using the systems and methods described herein.

| Time | Resource Reference | Consumption Amount |
|------|--------------------|--------------------|
| 2    | A                  | 100                |
| 4    | B                  | 200                |
| 6    | C                  | 200                |
| 8    | A                  | −100               |
| 10   | C                  | −200               |

| Time | Resource Reference | Consumption Amount |
|---|---|---|
| 12 | D | 400 |
| 14 | D | −400 |
| 10000 | B | −200 |

In the above table, time is shown as 2, 4, 6, 8, . . . . 10000. The value 10000 is the maximum that may be represented in this illustration. Note, resources A, C, D all have defined end times, but resource B does not. If the resource B is released, prior to the time 10000, this is changed to the time of release. That is, for a particular resource which does not have a specified end time, the end time is set at an arbitrary high number, and replaced when the resource is released to the time of release.

For a first example, assume a query for the current resource utilization at time 4—the answer is 300—a summation of all entries up to and including time 4. Here, only the resources A, B are in the database with positive values of 100, 200 which total 300.

The following table provides the full set of summations, providing the instantaneous consumption for all times based on the resources A, B, C, D in FIG. 5. Note, the instantaneous consumption is a summation of all entries up to and including the particular time associated with the instantaneous consumption.

| Time | Instantaneous Consumption |
|---|---|
| 0, 1 | 0 |
| 2, 3 | 100 |
| 4, 5 | 300 |
| 6, 7 | 500 |
| 8, 9 | 400 |
| 10, 11 | 200 |
| 12, 13 | 600 |
| 14-9999 | 200 |
| 10000+ | 0 |

Again, the determination of the instantaneous consumption, at any time, is a simple summation of all entries in the database up to and including the time of interest.

For a second example, assume a query for the peak resource utilization between time 4 and time 9—the summation of entries gives 300 which is the consumption amount at the beginning of the time period at time 4, whilst the maximum value of additional utilization, as indicated by the events at time 6 being +200, and 8 being −100 is a further 200, giving a resultant answer of 500. Here, the summation during the specified time period—time 4 to time 9—only adds the resource C at time 6 for 200, which is added to the consumption amount at the beginning of the time period at time 4, to yield a peak consumption of 500 during the time period time 4 to time 9.

A full set of peak resource utilization is as follows:

| Start Time | End Time | Start Consumption | Peak Consumption |
|---|---|---|---|
| 0, 1 | 0, 1 | 0 | 0 |
|  | 2, 3 | 0 | 100 |
|  | 4, 5 | 0 | 300 |
|  | 6-11 | 0 | 500 |
|  | 12+ | 0 | 600 |
| 2, 3 | 2, 3 | 100 | 100 |
|  | 4, 5 | 100 | 300 |
|  | 6-11 | 100 | 500 |
|  | 12+ | 100 | 600 |
| 4, 5 | 4, 5 | 300 | 300 |
|  | 6-11 | 300 | 500 |
|  | 12+ | 300 | 600 |
| 6, 7 | 6-11 | 500 | 500 |
|  | 12+ | 500 | 600 |
| 8, 9 | 8-11 | 400 | 400 |
|  | 12+ | 400 | 600 |
| 10-11 | 10-11 | 200 | 200 |
|  | 12+ | 200 | 600 |
| 12-13 | 12+ | 600 | 600 |
| 14-9999 | 14-9999 | 200 | 200 |
| 10000 | 10000+ | 0 | 0 |

Again, the peak consumption is the value of interest over a time period because it determines how much spare capacity is available, worst case, in the time period.

The following pseudo code provide is for finding the maximum utilization within a specified time period such as through the second exemplary query. Here the "adjustment of the reference value" is simply to establish the peak use of either CIR or EIR.

```
Bandwidth start = getConsumed(resource,timeBounds.getStart( ));
OrderedList eventList =getEventsBetweenExclusive(resource,-
timeBounds);
int maxUsedCir = start.getCIR( );
int maxUsedEir = start.getEIR( );
int usedCir = maxUsedCir;
int usedEir = maxUsedEir;
foreach event in eventList {
        usedCir = usedCir + event.getCIR( );
        usedEir = usedEir + event.getEIR( );
        maxUsedCir = maximum(maxUsedCir, usedCir);
        maxUsedEir = maximum(maxUsedEir, usedEir);
}
Bandwidth maxUtilisation = Bandwidth(maxUsedCir,maxUsedEir);
```

The value 'maxUtilisation' contains the peak utilisation within the time period 'timePeriod'. Subtraction of the maximum from the known capacity of the resource could be used to determine ability to accommodate further consumption.

However, an alternative method is available which offers the ability to fail-fast—as soon as impossibility is established—thereby avoiding the need to iterate each event, although the similarity of algorithm can still be seen. Here the "adjustment of the reference value" is the remaining capacity—which can be validated at each update to ensure continued ability to accommodate the requested consumption—and the loop exited immediately if the remaining bandwidth drops too low.

```
Bandwidth start = getConsumed(resource,timeBounds.getStart( ));
OrderedList eventList= getEventsBetweenExclusive(resource,-
timeBounds);
int eventCount=events.size( );
Event event;
int requestedCir = requestedConsumption.getCIR( );
int requestedEir = requestedConsumption.getEIR( );
int remainingCir = bookableCIR − start.getCIR( );
int remainingEir = bookableEIR − start.getEIR( );
int pointer=0;
boolean available = ( (requestedCir <= remainingCir) &&
(requestedEir <= remainingEir) );
while( available && (pointer < eventCount) ){
        event=eventList.getEntry(pointer);
```

```
    pointer = pointer + 1;
    remainingCir = remainingCir − event.getCIR( );
    remainingEir = remainingEir − event.getEIR( );
    available = ( (requestedCir <= remainingCir) &&
    (requestedEir <= remainingEir) );
        }
```

Here, upon completion of code snippet the value 'available' contains the Boolean (truth) value of whether requested bandwidth 'requestedConsumption' can be accommodated within the time period 'timePeriod'.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method comprising:
in a time-bounded resource management system for managing a resource, the time-bounded resource management system including a processor communicatively coupled to a database and a network interface communicatively coupled to a resource system where the resource is utilized, storing each resource consumption event of the resource as a balanced pair of entries that are separate records in the database, wherein the balanced pair of entries comprise 1) a first entry comprising a start time for the resource consumption event and a positive resource consumption amount and 2) a second entry comprising an end time for the resource consumption event and a negative resource consumption amount with the same magnitude as the positive resource consumption amount and with a negative value;
receiving a query related to the resource;
performing computations on entries in the database related to the query, said computations comprising a summation of specific entries in the database based on the query; and
providing a result based on the computations as a response to the query.

2. The method of claim 1, wherein the query is to determine instantaneous consumption of the resource at a certain time, and wherein the computations are a summation of all entries in the database up to the certain time.

3. The method of claim 1, wherein the query is to determine a peak consumption value or if additional consumption can be accommodated in a specified time period, wherein the computations are 1) a summation of all entries in the database up to a start time of the specified time period, and 2) iterating all entries in the database between the start time and an end time of the specified period to determine adjustments to a high-water mark, and wherein the high-water mark at the end of iterating all the entries is the peak consumption value.

4. The method of claim 1, wherein the database supports Structured Query Language (SQL) and the computations are performed through an SQL function.

5. The method of claim 1, wherein the storing is performed in addition to maintaining a database order book for each resource.

6. The method of claim 1, wherein the method is implemented in a Network Management System (NMS) and utilized to visually present instantaneous consumption on a per link basis.

7. The method of claim 1, wherein coherency in the database is checked by the query having the start time and the end time based on a maximum representation of time permitted with an expected output for consumption of zero.

8. The method of claim 1, wherein each resource consumption event in the database is removed after each associated end time.

9. The method of claim 1, wherein the resource is bandwidth and one of Committed Information Rate (CIR), Excess Information Rate (EIR), and a combination thereof.

10. The method of claim 9, wherein the query determines both the CIR and the EIR for a corresponding resource.

11. A time-bounded resource management system, comprising:
a network interface communicatively coupled to a resource system where a resource is utilized;
a processor;
a database, wherein the network interface, the processor, and the database are communicatively coupled together; and
memory storing instructions that, when executed, cause the processor to
store each resource consumption event of the resource as a balanced pair of entries that are separate records in the database, wherein the balanced pair of entries comprise 1) a first entry comprising a start time for the resource consumption event and a positive resource consumption amount and 2) a second entry comprising an end time for the resource consumption event and a negative resource consumption amount with the same magnitude as the positive resource consumption amount and with a negative value, receive a query related to the resource, via the network interface, perform computations on entries in the database related to the query, said computations comprising a summation of specific entries in the database based on the query, and provide a result based on the computations as a response to the query.

12. The system of claim 11, wherein the query is to determine instantaneous consumption of the resource up to a certain time, and wherein the computations are a summation of all entries in the database up to the certain time.

13. The system of claim 11, wherein the query is to determine a peak consumption value or if additional consumption can be accommodated in a specified time period, wherein the computations are 1) a summation of all entries in the database up to a start time of the specified time period, and 2) iterating all entries in the database between the start time and an end time of the specified period to determine adjustments to a high-water mark, and wherein the high-water mark at the end of iterating all the entries is the peak consumption value.

14. The system of claim 11, wherein the database supports Structured Query Language (SQL) and the computations are performed through an SQL function.

15. The system of claim 11, wherein the balanced pair of entries are stored in addition to maintenance of a database order book for each resource.

16. The system of claim 11, wherein the system is a Network Management System (NMS) that visually presents current resource allocation on a per link basis.

17. The system of claim 11, wherein the resource is bandwidth and one of Committed Information Rate (CIR), Excess Information Rate (EIR), and a combination thereof.

18. A management system communicatively coupled to one or more network elements in a networking system, the management system comprising:

a network interface communicatively coupled to the one or more network elements in the networking system where a resource is bandwidth in the networking system;

a processor;

a database, wherein the network interface, the processor, and the database are communicatively coupled together; and memory storing instructions that, when executed, cause the processor to store each resource consumption event of the resource as a balanced pair of entries that are separate records in the database, wherein the balanced pair of entries comprise 1) a first entry comprising a start time for the resource consumption event and a positive resource consumption amount and 2) a second entry comprising an end time for the resource consumption event and a negative resource consumption amount with the same magnitude as the positive resource consumption amount and with a negative value, receive a query to determine instantaneous resource utilization on a specific path in the network, sum all of the events in the database related to the query up to a present time, using a database command, and provide the sum as a response to the query.

19. The management system of claim 18, wherein the memory storing instructions that, when executed, further cause the processor to visually display a representation of the network, and visually display the instantaneous resource utilization for each link in the network.

20. The management system of claim 18, wherein the resource is bandwidth and one of Committed Information Rate (CIR), Excess Information Rate (EIR), and a combination thereof.

* * * * *